(12) United States Patent
Thies

(10) Patent No.: US 8,640,436 B2
(45) Date of Patent: Feb. 4, 2014

(54) ARRANGEMENT FOR THE DISCHARGE OF EXHAUST AIR SEPARATED FROM THE LUBRICATING OIL DE-AERATION SYSTEM OF A GAS-TURBINE ENGINE

(75) Inventor: Robert Thies, Schwielowsee (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 588 days.

(21) Appl. No.: 12/968,792

(22) Filed: Dec. 15, 2010

(65) Prior Publication Data

US 2011/0146223 A1    Jun. 23, 2011

(30) Foreign Application Priority Data

Dec. 21, 2009    (DE) .................. 10 2009 060 051

(51) Int. Cl.
*F02G 3/00* (2006.01)
(52) U.S. Cl.
USPC ....................................... 60/39.08; 60/39.091
(58) Field of Classification Search
USPC ............ 60/39.08, 39.091, 782, 785, 795, 801
See application file for complete search history.

(56) References Cited

U.S. PATENT DOCUMENTS

| | | | |
|---|---|---|---|
| 5,104,069 A | | 4/1992 | Reising |
| 5,429,208 A | | 7/1995 | Largillier et al. |
| 6,116,015 A | * | 9/2000 | Taylor et al. .............. 60/39.08 |
| 7,032,387 B2 | | 4/2006 | Germain et al. |
| 7,891,195 B2 | | 2/2011 | Bouty et al. |
| 8,235,647 B2 | | 8/2012 | Pisseloup et al. |
| 2002/0178729 A1 | * | 12/2002 | Care et al. ...................... 60/772 |
| 2010/0143094 A1 | | 6/2010 | Pisseloup et al. |
| 2010/0293917 A1 | * | 11/2010 | Handley et al. .............. 60/39.08 |
| 2010/0293964 A1 | * | 11/2010 | Sheaf et al. ..................... 60/801 |

FOREIGN PATENT DOCUMENTS

| | | |
|---|---|---|
| DE | 3605619 | 8/1987 |
| DE | 102007058953 | 6/2009 |
| EP | 1316678 | 6/2003 |
| EP | 1843032 | 10/2007 |
| EP | 2067963 | 6/2009 |
| GB | 2376269 | 12/2002 |

OTHER PUBLICATIONS

German Search Report dated Aug. 23, 2010 from counterpart patent application.
European Search Report dated Nov. 6, 2013 for counterpart European Patent Application No. 10193852.0.

* cited by examiner

*Primary Examiner* — Gerald L Sung
(74) *Attorney, Agent, or Firm* — Timothy J. Klima; Shuttleworth & Ingersoll, PLC

(57) ABSTRACT

With an arrangement for the discharge of oil-contaminated exhaust air separated from the lubricating oil de-aeration system of a gas-turbine engine and led to the atmosphere via a venting line, the venting line (13) issues into an attenuation chamber (12) formed within the exhaust cone (9) of the gas-turbine engine and connected to a Venturi nozzle (14) via a discharge tube (17) for drawing off the oil-contaminated exhaust air and blowing it into the exhaust-gas flow, with the Venturi nozzle (14) being arranged in the exhaust gas-flow of the gas-turbine engine and oriented in a flow direction. The oil-contaminated exhaust air is completely discharged with the exhaust-gas flow without contacting visible engine parts.

11 Claims, 1 Drawing Sheet

Figure 1:
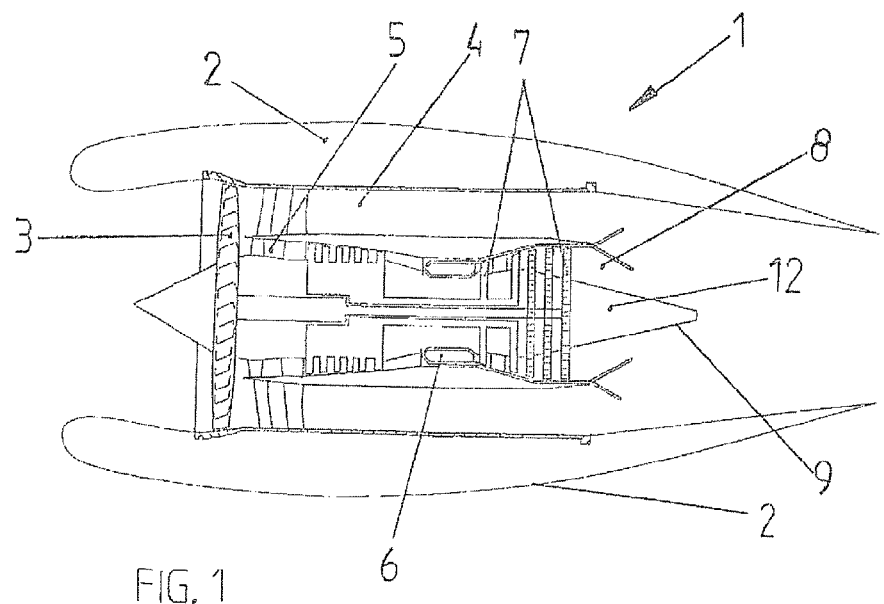

ARRANGEMENT FOR THE DISCHARGE OF EXHAUST AIR SEPARATED FROM THE LUBRICATING OIL DE-AERATION SYSTEM OF A GAS-TURBINE ENGINE

This application claims priority to German Patent Application DE102009060051.5 filed Dec. 21, 2009, the entirety of which is incorporated by reference herein.

This invention relates to an arrangement for the discharge of oil-contaminated exhaust air separated from the lubricating oil de-aeration system of a gas-turbine engine and led to the atmosphere via a venting line.

In the bearing housings of gas-turbine engines, the lubricating oil mixes with sealing air which, as is generally known, is separated from the lubricating oil returned to the oil tank by a de-aeration system and discharged to the atmosphere via a venting line and a venting port issuing at the outside of the engine fairing (nacelle) or the fairing (pylon) of the engine mounting arrangement. However, the discharged air still contains oil particles which lead to considerable contamination of the fairing of the engine or the engine mounting arrangement on the aircraft fuselage, with this contamination being aggravated even more by adhering dirt and dust particles. Such contamination is aesthetically undesirable and, when burnt into the fairing by the high engine temperature, can only be removed by costly cleaning measures. The known proposals for the solution of this problem are aimed at discharging the oil-contaminated air (oil air) at a position as remote as possible from the surface of the fairing to avoid contact of the oil air with the surface of the fairing. The configuration of such air outlet openings, which must also be aerodynamically faired because of the high in-flight air drag and necessitate the provision of a long venting line extending up to the outside of the fairing of the engine or the engine mounting arrangement, incurs high investment and an increase in weight.

In a broad aspect, the present invention provides an arrangement for discharging the air issuing from the lubricating oil de-aeration system of a gas-turbine engine by which oil contamination of the fairing of the engine or the engine mounting arrangement is avoided and also a saving in weight is achieved. In other words, the present invention, in essence, provides that the oil-particle contaminated exhaust air (oil air) from the lubricating oil de-aeration system issues via a venting line, which is substantially reduced in length, directly into an attenuation chamber essentially formed by the exhaust cone of the gas-turbine engine, and the exhaust air in the attenuation chamber is connected via a discharge tube to a Venturi nozzle arranged in the exhaust-gas flow of the gas-turbine engine and oriented in flow direction. The low static pressure at the narrowest part of the nozzle body, and thus in the discharge tube, and the pressure difference relative to the high-pressure exhaust air in the attenuation chamber effect that the exhaust air is drawn off the attenuation chamber, then entrained by the gas flow in the nozzle body and introduced into the exhaust-gas flow and distributed therein. Thus, oil particles are prevented from depositing on any of the engine parts, in particular on visible surfaces. The reduced length of the venting line also enables a saving in weight to be achieved.

In development of the present invention, the attenuation chamber is confined by the exhaust cone as well as an exhaust-gas stator casing of the engine and a rear wall. The venting line directly issues into the attenuation chamber via an opening provided in the rear wall.

The nozzle body of the Venturi nozzle is positioned remotely from the inner surfaces of the exhaust flow duct. The position of the nozzle body is settable via the respective length of the discharge tube.

Preferably, the nozzle body is positioned centrally in the exhaust-gas flow so that the oil-contaminated exhaust air is completely absorbed in the exhaust-gas flow and discharged with the latter.

In further development of the present invention, a portion of the discharge tube issuing into the attenuation chamber conically widens towards the tube opening to ensure good suction effect.

Figure 2:
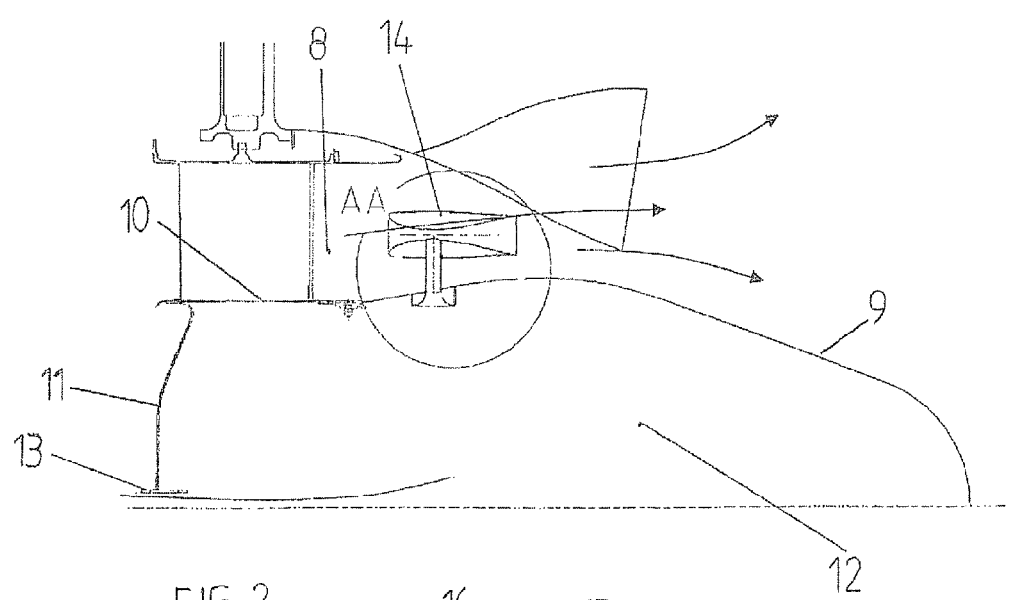
Figure 3:
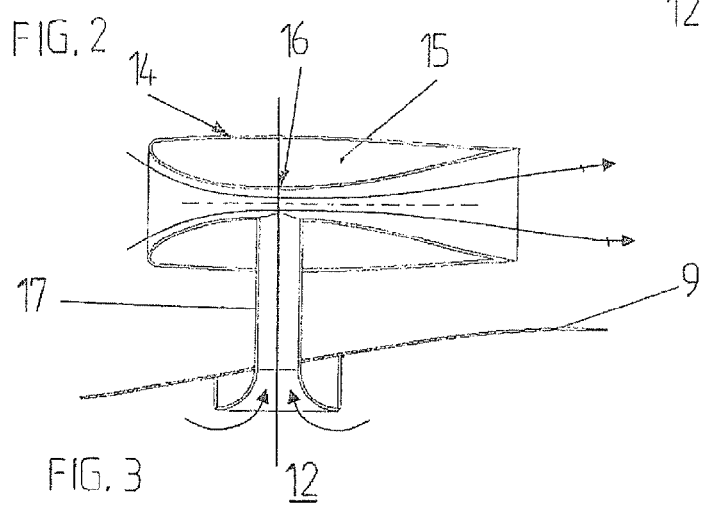

The present invention is more fully described in light of the accompanying drawings, showing a preferred embodiment. In the drawings, FIG. 1 is a schematic sectional view of a turbofan gas-turbine engine provided with an engine fairing and a chamber-type exhaust cone, FIG. 2 is a partial view of the rear engine portion with a Venturi nozzle connected to the exhaust cone and integrated into the exhaust-gas flow of the engine, and FIG. 3 is a detailed view AA of the Venturi nozzle according to FIG. 2.

The turbofan engine 1 shown in FIG. 1 is enclosed by an engine fairing 2 at whose outer surface—on known engines—a venting line coming from the lubricating oil de-aeration system usually issues to discharge the oil air to the atmosphere. The engine includes a bypass duct 4 disposed downstream of the fan 3 as well as a core-flow duct 5 transiting downstream of the combustion chambers 6 and the turbines 7 into an exhaust flow duct 8. The exhaust flow duct 8 is inwardly confined by the outer wall surface of the exhaust cone 9. As shown in FIG. 2, the exhaust cone 9, together with the exhaust-gas stator casing 10 and a rear wall 11, forms a closed attenuation chamber 12 into which a venting line 13 issues which is connected to the lubricating oil de-aeration system and which is significantly shorter than in the aforementioned state of the art. Arranged in the exhaust flow duct 8, actually remote and spaced apart from the wall surfaces confining the exhaust flow duct, is a Venturi nozzle 14 whose nozzle body 15 is directed in the direction of the exhaust-gas flow and whose discharge tube 17, which is connected to the narrowest part 16 of the nozzle body 15, communicates with the attenuation chamber 12. A distance of the spacing of the nozzle body 15 remote from the adjacent wall surfaces is selected by choosing a certain length of the discharge tube 17.

In operation of the turbofan engine 1, part of the exhaust-gas flow passes around and through the Venturi nozzle 14. The static pressure at the narrowest part 16 of the nozzle body 15 decreases according to the Venturi nozzle principle, with the pressure in the discharge tube 17 connected to the narrowest part 16 of the nozzle body 15 simultaneously decreasing, while the pressure of the oil air in the attenuation chamber 12 is at a significantly higher level. The pressure difference accordingly effects that the oil air is drawn off the attenuation chamber 12 and initially mixed with the exhaust-gas flow in the nozzle body 15, and finally with the entire exhaust-gas flow, to be then discharged to the atmosphere without contacting any engine parts.

LIST OF REFERENCE NUMERALS

1 Turbofan engine
2 Engine fairing
3 Fan
4 Bypass duct
5 Core-flow duct
6 Combustion chamber
7 Turbines
8 Exhaust flow duct
9 Exhaust cone 10 Exhaust-gas stator casing
11 Rear wall
12 Attenuation chamber
13 Venting line
14 Venturi nozzle
15 Nozzle body
16 Narrowest part of 15
17 Discharge tube

What is claimed is:

1. An arrangement for discharging oil-contaminated exhaust air separated by a lubricating oil de-aeration system of a gas-turbine engine, comprising:
   an attenuation chamber formed within an exhaust cone of the gas-turbine engine for connecting to an oil-contaminated exhaust air venting line of the lubricating oil de-aeration system;
   a Venturi nozzle being arranged in an exhaust-gas flow in an exhaust flow duct of the gas-turbine engine and oriented in a flow direction such that a portion of the exhaust-gas flow flows through the Venturi nozzle;
   a discharge tube connecting the attenuation chamber to the Venturi nozzle so that the Venturi nozzle draws off oil-contaminated exhaust air from the attenuation chamber and introduces the oil-contaminated exhaust air into the exhaust-gas flow.

2. The arrangement of claim 1, wherein the attenuation chamber is confined by the exhaust cone, an exhaust-gas stator casing and a rear wall of the gas-turbine engine, and the oil-contaminated exhaust air venting line is connected to the attenuation chamber via an opening provided in the rear wall.

3. The arrangement of claim 2, wherein the Venturi nozzle includes a nozzle body spaced apart from an inner surface of the exhaust flow duct, a distance that the nozzle body is spaced from the inner surface being settable via a respective length of the discharge tube.

4. The arrangement of claim 3, wherein the nozzle body is positioned essentially centrally in the exhaust-gas flow.

5. The arrangement of claim 4, wherein an intake end of the discharge tube connected to the attenuation chamber widens in at least one of a cone-shape and a bell-shape towards an opening of the discharge tube.

6. The arrangement of claim 1, wherein the Venturi nozzle includes a nozzle body spaced apart from an inner surface of the exhaust flow duct, a distance that the nozzle body is spaced from the inner surface being settable via a respective length of the discharge tube.

7. The arrangement of claim 6, wherein the nozzle body is positioned essentially centrally in the exhaust-gas flow.

8. The arrangement of claim 7, wherein an intake end of the discharge tube connected to the attenuation chamber widens in at least one of a cone-shape and a bell-shape towards an opening of the discharge tube.

9. The arrangement of claim 1, wherein the Venturi nozzle is positioned essentially centrally in the exhaust-gas flow.

10. The arrangement of claim 9, wherein an intake end of the discharge tube connected to the attenuation chamber widens in at least one of a cone-shape and a bell-shape towards an opening of the discharge tube.

11. The arrangement of claim 1, wherein an intake end of the discharge tube connected to the attenuation chamber widens in at least one of a cone-shape and a bell-shape towards an opening of the discharge tube.

* * * * *